(12) United States Patent
Qiu (10) Patent No.: US 11,356,282 B2
(45) Date of Patent: *Jun. 7, 2022

(54) SENDING CROSS-CHAIN AUTHENTICATABLE MESSAGES

(71) Applicant: Advanced New Technologies Co., Ltd., Grand Cayman (KY)

(72) Inventor: Honglin Qiu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/786,807

(22) Filed: Feb. 10, 2020

(65) Prior Publication Data

US 2020/0177572 A1 Jun. 4, 2020

Related U.S. Application Data

(63) Continuation of application No. PCT/CN2020/071555, filed on Jan. 11, 2020.

(30) Foreign Application Priority Data

Jun. 28, 2019 (CN) .......................... 201910577314.0

(51) Int. Cl.
*H04L 29/06* (2006.01)
*H04L 9/32* (2006.01)
(Continued)

(52) U.S. Cl.
CPC ........ *H04L 9/3265* (2013.01); *G06F 9/45558* (2013.01); *G06F 16/2379* (2019.01);
(Continued)

(58) Field of Classification Search
CPC ... H04L 9/3265; H04L 63/0823; H04L 63/08; H04L 9/3239; H04L 9/3247;
(Continued)

(56) References Cited

U.S. PATENT DOCUMENTS 10,298,585 B1 * 5/2019 Treat .................... H04L 9/0643
10,419,209 B1 * 9/2019 Griffin ................. H04L 9/3247
(Continued)

FOREIGN PATENT DOCUMENTS

CN 107301536 10/2017
CN 107424073 12/2017
(Continued)

OTHER PUBLICATIONS

Wang, Ke; Zhang, Zhizhe; Kim, Hyong S.; "ReviewChain: Smart contract based review system with multi-blockchain gateway", International Conference on iThings, GreenCom, CPSCom, and SmartData, IEEE, Jul. 30-Aug. 3, 2018, pp. 1521-1526.*
(Continued)

*Primary Examiner* — Victor Lesniewski
(74) *Attorney, Agent, or Firm* — Fish & Richardson P.C.

(57) ABSTRACT

Disclosed herein are computer-implemented methods; computer-implemented systems; and non-transitory, computer-readable media, for sending cross-chain messages. One computer-implemented method includes storing an authenticable message (AM) associated with a first account of a blockchain node to a blockchain associated with the first blockchain network, where the AM comprises an identifier (ID) of the first blockchain network, information of the first account, and information of a recipient of the AM. The AM and location information is translated to a relay to be forwarded to the recipient located outside of the first blockchain network, where the location information identifies a location of the AM in the first blockchain and the recipient includes one or more accounts outside of the first blockchain network.

24 Claims, 3 Drawing Sheets

(51) Int. Cl.
*H04L 9/40* (2022.01)
*G06F 9/455* (2018.01)
*G06F 16/23* (2019.01)

(52) U.S. Cl.
CPC .......... *H04L 63/08* (2013.01); *H04L 63/0823* (2013.01); *G06F 2009/45595* (2013.01)

(58) Field of Classification Search
CPC ............... H04L 63/123; G06F 9/45558; G06F 16/2379; G06F 21/64
See application file for complete search history.

(56) References Cited

U.S. PATENT DOCUMENTS

| | | | |
|---|---|---|---|
| 11,088,854 B2 | 8/2021 | El Abed et al. | |
| 11,157,876 B1* | 10/2021 | Knas | H04L 9/0637 |
| 11,182,851 B2* | 11/2021 | Derbakova | G06Q 40/025 |
| 11,194,837 B2* | 12/2021 | Vo | G06F 16/2365 |
| 11,196,564 B2* | 12/2021 | Hofig | H04L 9/3239 |
| 2016/0330034 A1 | 11/2016 | Back et al. | |
| 2017/0132419 A1* | 5/2017 | Gupta | G06F 11/3672 |
| 2017/0352027 A1 | 12/2017 | Zhang et al. | |
| 2018/0137507 A1* | 5/2018 | Jayachandran | G06Q 20/401 |
| 2018/0373776 A1* | 12/2018 | Madisetti | G06F 16/27 |
| 2019/0013948 A1 | 1/2019 | Mercuri et al. | |
| 2019/0018887 A1* | 1/2019 | Madisetti | H04L 9/3236 |
| 2019/0019367 A1 | 1/2019 | Unagami et al. | |
| 2019/0028277 A1* | 1/2019 | Jayachandran | H04L 9/085 |
| 2019/0058581 A1 | 2/2019 | Wood et al. | |
| 2019/0081793 A1 | 3/2019 | Martino et al. | |
| 2019/0130399 A1 | 5/2019 | Wright et al. | |
| 2019/0158594 A1* | 5/2019 | Shadmon | H04L 9/0819 |
| 2019/0188657 A1 | 6/2019 | Arora et al. | |
| 2019/0188787 A1 | 6/2019 | Besanson Tuma et al. | |
| 2019/0207762 A1* | 7/2019 | Xie | H04L 9/3247 |
| 2019/0220813 A1* | 7/2019 | Madisetti | G06Q 10/0833 |
| 2019/0228409 A1* | 7/2019 | Madisetti | H04L 9/0637 |
| 2019/0238327 A1 | 8/2019 | Li et al. | |
| 2019/0289068 A1* | 9/2019 | Ma | H04L 67/327 |
| 2019/0303888 A1* | 10/2019 | Hamasni | G06Q 20/0655 |
| 2019/0311337 A1* | 10/2019 | Madisetti | G06Q 20/3825 |
| 2019/0311357 A1* | 10/2019 | Madisetti | H04L 9/3239 |
| 2019/0327080 A1* | 10/2019 | Liu | H04L 9/0637 |
| 2019/0340266 A1* | 11/2019 | Vo | G06F 16/27 |
| 2019/0340267 A1* | 11/2019 | Vo | G06F 16/2365 |
| 2019/0370792 A1* | 12/2019 | Lam | H04L 9/085 |
| 2019/0385156 A1* | 12/2019 | Liu | G06Q 20/381 |
| 2020/0036514 A1* | 1/2020 | Christensen | H04L 9/3268 |
| 2020/0036712 A1 | 1/2020 | Soundararajan et al. | |
| 2020/0084046 A1* | 3/2020 | Bessonov | H04L 9/14 |
| 2020/0104296 A1* | 4/2020 | Hunn | G06F 16/2379 |
| 2020/0120019 A1 | 4/2020 | Chen et al. | |
| 2020/0177391 A1 | 6/2020 | Qiu | |
| 2020/0219093 A1 | 7/2020 | Malhotra et al. | |
| 2020/0242595 A1 | 7/2020 | Harrison | |
| 2020/0252206 A1* | 8/2020 | Yeung | G06Q 20/401 |
| 2020/0278958 A1* | 9/2020 | Zhang | G06F 16/2379 |
| 2020/0296082 A1 | 9/2020 | Killoran, Jr. et al. | |
| 2020/0327616 A1* | 10/2020 | Burke | H04L 67/1097 |
| 2020/0364188 A1* | 11/2020 | Hintermeister | G06F 16/1824 |
| 2020/0389294 A1* | 12/2020 | Soundararajan | G06Q 20/36 |
| 2021/0135848 A1 | 5/2021 | Li et al. | |
| 2021/0142318 A1* | 5/2021 | Qian | G06Q 20/3674 |
| 2021/0150065 A1 | 5/2021 | Qiu | |
| 2021/0152365 A1 | 5/2021 | Nosseir et al. | |
| 2021/0158340 A1 | 5/2021 | Yang | |
| 2021/0160053 A1 | 5/2021 | Yang | |
| 2021/0167970 A1 | 6/2021 | Li et al. | |
| 2021/0184837 A1 | 6/2021 | Yang | |
| 2021/0201257 A1* | 7/2021 | Mohamed | G06Q 10/087 |
| 2021/0203482 A1 | 7/2021 | Li et al. | |
| 2021/0209614 A1* | 7/2021 | Bakalis | H04L 9/0825 |
| 2021/0233071 A1 | 7/2021 | Wright et al. | |
| 2021/0263504 A1* | 8/2021 | Hofig | H04L 9/3239 |
| 2021/0266163 A1 | 8/2021 | Zeng et al. | |
| 2021/0272111 A1* | 9/2021 | Wu | G06Q 20/02 |
| 2021/0278823 A1* | 9/2021 | Sauer | G06F 16/27 |
| 2021/0281428 A1* | 9/2021 | Kempf | G06F 9/5072 |
| 2021/0312444 A1 | 10/2021 | Liu | |
| 2021/0326328 A1 | 10/2021 | Yang | |
| 2021/0326813 A1* | 10/2021 | Wang | G06Q 20/02 |
| 2021/0337033 A1* | 10/2021 | Madisetti | H04L 43/0817 |
| 2021/0352139 A1* | 11/2021 | Madisetti | H04L 67/108 |

FOREIGN PATENT DOCUMENTS

| | | |
|---|---|---|
| CN | 108009811 | 5/2018 |
| CN | 108269190 | 7/2018 |
| CN | 108389129 | 8/2018 |
| CN | 108573016 | 9/2018 |
| CN | 108683630 | 10/2018 |
| CN | 108712257 | 10/2018 |
| CN | 108810137 | 11/2018 |
| CN | 109035012 | 12/2018 |
| CN | 109063016 | 12/2018 |
| CN | 109146677 | 1/2019 |
| CN | 109150943 | 1/2019 |
| CN | 109600367 | 4/2019 |
| CN | 109784881 | 5/2019 |
| CN | 109815657 | 5/2019 |
| CN | 110311790 | 10/2019 |
| CN | 110430162 | 11/2019 |
| CN | 110430235 | 11/2019 |
| CN | 110443704 | 11/2019 |
| TW | 1663865 | 6/2019 |
| TW | 201822088 | 6/2019 |
| WO | WO 2019072272 | 4/2019 |

OTHER PUBLICATIONS

Zheng, Jiawei; Dong, Xuewen; Zhang, Tao; Chen, Junfeng; Tong, Wei; Yang, Xiaozhou; "MicrothingsChain: Edge Computing and Decentralized IoT Architecture Based on Blockchain for Cross-domain Data Shareing", International Conference on Networking and Network Applications (NaNA), IEEE, Oct. 12-15, 2018, pp. 350-355.*

Jin, Hai; Dai, Xiaohai; Xiao, Jiang; "Towards a Novel Architecture for Enabling Interoperability Amongst Multiple Blockchains", 38th International Conference on Distributed Computing Systems (ICDCS), IEEE, Jul. 2-6, 2018, pp. 1203-1211.*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

U.S. Appl. No. 16/786,437, Qiu, filed Feb. 10, 2020.

U.S. Appl. No. 16/786,949, Qiu, filed Feb. 10, 2020.

PCT International Search Report and Written Opinion in PCT Appln No. PCT/CN2020/071555, dated Mar. 19, 2020, 13 pages (with partial English translation).

PCT International Search Report and Written Opinion in PCT Appln No. PCT/CN2020/071367, dated Mar. 31, 2020, 17 pages (with English translation).

PCT International Search Report and Written Opinion in PCT Appln No. PCT/CN2020/071574, dated Apr. 13, 2020, 14 pages (with partial English translation).

Jin, "Towards a Novel Architecture for Enabling Interoperability Amongst Multiple Blockchains", 38th International Conference on Distributed Computing Systems (ICDCS), IEEE, Jul. 2-6, 2018, pp. 1203-1211.

Wang, "ReviewChain: Smart contract based review system with multi-blockchain gateway", International Conference on iThings, GreenConn, CPSConn, and SnnartData, IEEE, Jul. 30-Aug. 3, 2018, pp. 1521-1526.

Zheng, "MicrothingsChain: Edge Computing and Decentralized IoT Architecture Based on Blockchain for Cross-domain Data Share- (56) References Cited

OTHER PUBLICATIONS ing", International Conference on Networking and Network Applications (NaNA), IEEE, Oct. 12-15, 2018, pp. 350-355.

* cited by examiner

SENDING CROSS-CHAIN AUTHENTICATABLE MESSAGES

CROSS-REFERENCE TO RELATED APPLICATIONS

This application is a continuation of PCT Application No. PCT/CN2020/071555, filed on Jan. 11, 2020, which claims priority to Chinese Patent Application No. 201910577314.0, filed on Jun. 28, 2019, and each application is hereby incorporated by reference in its entirety.

TECHNICAL FIELD

Implementations of the present specification relate to the field of blockchain technologies, and more specifically, to a method and a device for sending a cross-chain authenticatable message.

BACKGROUND

A blockchain technology, also known as a distributed ledger technology, is a decentralized or distributed database technology. The blockchain technology has features such as decentralization, openness and transparency, tamper-resistance, and trustworthiness. Data in a blockchain network is broadcast to blockchain nodes in an entire network, each blockchain node has complete and consistent data. As the blockchain technology becomes increasingly popular, different types of blockchain networks have emerged and have been applied to fields such as finance, healthcare, supply blockchain network, asset management, and backtracing. However, most of applications on the blockchain network (cryptocurrency or smart contract) cannot be applied beyond the boundary of a particular blockchain network, and cannot cooperate with other blockchain networks to implement value exchanges, which affects functions of the blockchain network. How to enable different types of blockchain networks to cooperate to implement value exchange has become a direction of exploration. Currently, many cross-chain technologies have emerged. However, different cross-chain technologies have different unique designs and are applied to different scenarios. For different cross-chain scenarios, one blockchain network may need to be connected to various cross-chain platforms.

As such, a solution for more effective sending of cross-chain information is needed.

SUMMARY

Implementations of the present specification are intended to provide a solution for more effective sending of a cross-chain authenticatable message, to alleviate disadvantages in an existing technology.

To achieve the previous objective, an aspect of the present specification provides a method for sending a cross-chain authenticatable message, where sending a cross-chain authenticatable message refers to sending the authenticatable message from a first account in a first blockchain network to the outside, the first blockchain network is connected to the relay, and the method is performed by the first blockchain network and includes: storing first data through consensus into the first blockchain network by using a first interface that is of a locally pre-determined processing module and that is invoked by the first account, and based on processing of the processing module, where the first data includes an authenticatable message, and the authenticatable message includes at least the following fields that satisfy a pre-determined protocol: a sending blockchain identifier, a sending account, receiving object information, and message content, where the sending blockchain identifier and the sending account respectively correspond to the following field values: an identifier of the first blockchain network and the first account, and the following parameters are input when the first account invokes the first interface: receiving object information and message content; and providing the first data and first location information to the relay, to provide the authenticatable message to the receiving object, where the first location information indicates a location of the first data in the first blockchain network, and the relay is connected to a system in which the receiving object is located.

In an implementation, the processing module includes a first processor and a second processor, the first interface is an interface of the first processor, and storing first data through consensus into the first blockchain network by using a first interface that is of a locally pre-determined processing module and that is invoked by the first account, and based on processing of the processing module includes performing the following steps by using the first processor: obtaining at least the following parameters from the invocation by using the first interface: a first account, receiving object information, and message content; generating the authenticatable message based on the parameters; and providing the authenticatable message to the second processor.

In an implementation, storing first data through consensus into the first blockchain network by using a first interface that is of a locally pre-determined processing module and that is invoked by the first account, and based on processing of the processing module further includes performing the following step by using the second processor: obtaining the authenticatable message from the first processor; and generating data with a specific structure based on the authenticatable message, to generate first data.

In an implementation, the second processor has a second interface, and providing the authenticatable message to the second processor includes: providing the authenticatable message to the second processor by invoking the second interface.

In an implementation, the first data is labeled with a pre-determined label.

In an implementation, the first data is a receipt, the data with a specific data structure is a log, a sending field, a receiving field, and a data field of the log are respectively an identifier of the first processor, an identifier of the second processor, and the authenticatable message, the second processor further includes a third interface connected to a local virtual machine, and storing first data through consensus into the first blockchain network by using a first interface that is of a locally pre-determined processing module and that is invoked by the first account, and based on processing of the processing module includes performing the following step by using the first processor: after the log is generated, providing the log to the virtual machine by using the third interface, to generate the first data.

In an implementation, the pre-determined label is the identifier of the first processor or the identifier of the second processor.

In an implementation, the first data is labeled with a pre-determined label, and the pre-determined label is the pre-determined topic.

In an implementation, the first account is a contract account of a first smart contract.

In an implementation, the relay is further connected to a second blockchain network, and the receiving object information includes a receiving blockchain identifier and a receiving account that respectively correspond to an identifier of the second blockchain network and a second account in the second blockchain network.

In an implementation, the authenticatable message satisfies a pre-determined protocol stack, the pre-determined protocol stack includes a first-layer protocol to a third-layer protocol from outside to inside, the first-layer protocol includes a sending blockchain identifier field and a second-layer protocol, the second-layer protocol includes a sending account field and a third-layer protocol, the third-layer protocol includes a receiving blockchain identifier field, a receiving account field, and a message content field.

In an implementation, the first-layer protocol further includes a protocol version number field and a reserved field.

In an implementation, the second-layer protocol further includes a type field used to indicate a usage scenario type of the authenticatable message.

In an implementation, the type is any one of the following types: message type, remote procedure call type, and issuance/subscription type.

In an implementation, the third-layer protocol further includes a sequence number field used to indicate a current sending sequence number when the authenticatable message is sent to the second account for a plurality of times by using the first account.

In an implementation, the authenticatable message satisfies a pre-determined protocol stack, the pre-determined protocol stack includes a first-layer protocol to a third-layer protocol from outside to inside, the first-layer protocol includes a sending blockchain identifier field, a receiving blockchain identifier field, and a second-layer protocol, the second-layer protocol includes a sending account field, a receiving account field, and a third-layer protocol, and the third-layer protocol includes a message content field.

Another aspect of the present specification provides a device for sending a cross-chain authenticatable message, where sending a cross-chain authenticatable message refers to sending the authenticatable message from a first account in a first blockchain network to the outside, the first blockchain network is connected to the relay, and the device is disposed in the first blockchain network and includes: a storing unit, configured to store first data through consensus into the first blockchain network by using a first interface that is of a locally pre-determined processing module and that is invoked by the first account, and based on processing of the processing module, where the first data includes an authenticatable message, and the authenticatable message includes at least the following fields that satisfy a pre-determined protocol: a sending blockchain identifier, a sending account, receiving object information, and message content, where the sending blockchain identifier and the sending account respectively correspond to the following field values: an identifier of the first blockchain network and the first account, and the following parameters are input when the first account invokes the first interface: receiving object information and message content; and a providing unit, configured to provide the first data and first location information to the relay, to provide the authenticatable message to the receiving object, where the first location information indicates a location of the first data in the first blockchain network, and the relay is connected to a system in which the receiving object is located.

In an implementation, the processing module includes a first processor and a second processor, the first interface is an interface of the first processor, and the storing unit further includes the following subunits disposed in the first processor: a first acquisition subunit, configured to obtain at least the following parameters from the invocation by using the first interface: a first account, receiving object information, and message content; a first generation subunit, configured to generate the authenticatable message based on the parameters; and a first providing subunit, configured to provide the authenticatable message to the second processor.

In an implementation, the storing unit further includes the following subunits disposed in the second processor: a second acquisition subunit, configured to obtain the authenticatable message from the first processor; and a second generation subunit, configured to generate data with a specific structure based on the authenticatable message, to generate first data.

In an implementation, the second processor has a second interface, and the first providing subunit is further configured to provide the authenticatable message to the second processor by invoking the second interface.

In an implementation, the first data is a receipt, the data with a specific data structure is a log, a sending field, a receiving field, and a data field of the log are respectively an identifier of the first processor, an identifier of the second processor, and the authenticatable message, the second processor further includes a second providing subunit, configured to: after the log is generated, provide the log to the virtual machine by using the third interface, to generate the first data.

Another aspect of the present specification provides a computer readable storage medium, where the medium stores a computer program, and when the computer program is executed on a computer, the computer is enabled to perform any one of the previous methods.

Another aspect of the present specification provides a computing device, including a memory and a processor, where the memory stores executable code, and when the processor executes the executable code, any one of the previous methods is implemented.

In the cross-chain solution provided in the implementations of the present specification, a platform-level processor performs related processing on the authenticatable message, to increase the processing speed and efficiency. In addition, in the processor, data with a specific structure can be customized by using a ledger on the platform, to improve the performance and scalability.

BRIEF DESCRIPTION OF DRAWINGS

To make the implementations of the present specification clearer, the following describes the implementations of the present specification with reference to the accompanying drawings.

DESCRIPTION OF IMPLEMENTATIONS

The following describes the implementations of the present specification with reference to the accompanying drawings.

Figure 1:
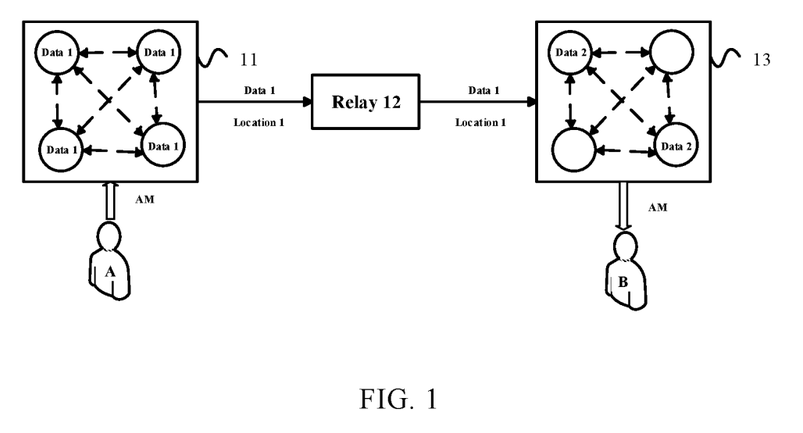
FIG. 1 is a schematic diagram illustrating a cross-chain system, according to an implementation of the present specification.

FIG. 1 is a schematic diagram illustrating a cross-chain system, according to an implementation of the present specification. As shown in FIG. 1, the cross-chain system includes a first blockchain network 11, a relay 12, and a second blockchain network 13. For example, the first blockchain network 11 includes account A, and the second blockchain network 13 includes account B, where both account A and account B are user accounts or contract accounts. When account A in the first blockchain network needs to send information to account B in the second blockchain network, account A can send the information as an authenticatable message (AM). The authenticatable message is included in first data (data 1) through consensus is performed and that is stored by account A into a blockchain network. For example, the second blockchain network 13 can include a plurality of simplified payment verification (SPV) nodes, and the SPV nodes locally pre-obtain second data (data 2) in the first blockchain network 11, and data 2 is used to verify data 1. Each SPV node can obtain the first data (data 1) and location information of the first data (location 1) through the relay 12 between the first block blockchain network 11 and the second blockchain network 13, and use data 2 to verify data 1, and provides the AM in data 1 to account B after the verification succeeds. Then, account B can perform service processing based on the AM.

It can be understood that the previous description with reference to FIG. 1 is only an example, but is not intended to limit the implementations of the present specification. For example, after obtaining data 1, the relay can verify data 1 based on the pre-obtained data 2 in the first blockchain network, adds a digital signature on data 1, and then sends data 1 and the digital signature to the second blockchain network; and the second blockchain network can verify the digital signature based on a public key of a relay blockchain network, to verify data 1.

The following describes the previous process in detail.

Figure 2:
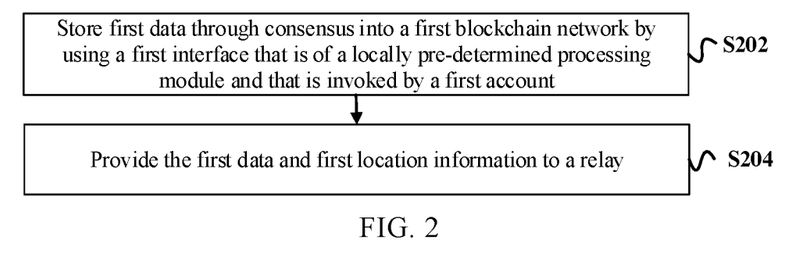
FIG. 2 is a flowchart illustrating a method for sending a cross-chain authenticatable message, according to an implementation of the present specification.

FIG. 2 is a flowchart illustrating a method for sending a cross-chain authenticatable message, where sending a cross-chain authenticatable message refers to sending the authenticatable message from a first account in a first blockchain network to the outside, and the first blockchain network is connected to the relay. The method is performed by the first blockchain network and includes:

Step S202: Store first data through consensus into the first blockchain network by using a first interface that is of a locally pre-determined processing module and that is invoked by the first account, and based on processing of the processing module, where the first data includes an authenticatable message, and the authenticatable message includes at least the following fields that satisfy a pre-determined protocol: a sending blockchain identifier, a sending account, receiving object information, and message content, where the sending blockchain identifier and the sending account respectively correspond to the following field values: an identifier of the first blockchain network and the first account, and the following parameters are input when the first account invokes the first interface: receiving object information and message content.

Step S204: Provide the first data and first location information to the relay, to provide the authenticatable message to the receiving object, where the first location information indicates a location of the first data in the first blockchain network, and the relay is connected to a system in which the receiving object is located.

In this implementation of the present specification, for example, the receiving object a second account in a second blockchain network, and a system in which the receiving is located is the second blockchain network. The following description is based on the previous example. It can be understood that a second system is not limited to another blockchain network. For example, the second system can alternatively be an off-blockchain channel or an off-blockchain application. The receiving object is not limited to an account, either. For example, the receiving object can alternatively be a group including a plurality of accounts.

The first blockchain network and the second blockchain network can be any blockchain network, for example, bitcoin blockchain network or Ethereum blockchain network. The bitcoin blockchain network and Ethereum blockchain network send messages through an authenticatable message with a unified format. Therefore, this implementation of the present specification does not impose a limitation on a blockchain network type and a specific application scenario. The relay is an intermediate component between the first blockchain network and the second blockchain network. The blockchain network can be in a plurality of forms. For example, the relay can be a node in the first blockchain network and the second blockchain network, that is, the relay has an account in the first blockchain network and an account in the second blockchain network; or the relay is a transfer device between the first blockchain network and the second blockchain network, which only transfers data but does not verify the data; or the relay is a trusted node, which verifies data received from the first blockchain network, and after the verification succeeds, sends the data to the second blockchain network; or the relay can be a verification blockchain network, which performs consensus verification on the data received from the first blockchain network, and then sends the data to the second blockchain network.

In step S202, the first data through consensus is stored into the first blockchain network by using a first interface that is of a locally pre-determined processing module and that is invoked by the first account, and based on processing of the processing module, where the first data includes an authenticatable message, and the authenticatable message includes at least the following fields that satisfy a pre-determined protocol: a sending blockchain identifier, a sending account, receiving object information, and message content, where the sending blockchain identifier and the sending account respectively correspond to the following field values: an identifier of the first blockchain network and the first account, and the following parameters are input when the first account invokes the first interface: receiving object information and message content.

As described above, receiving object information varies with the receiving object. For example, when the receiving object is a group of accounts in another blockchain network, the receiving object information can include a blockchain identifier of the another blockchain network, a group identifier of the group, and even an account identifier of each account in the group. For example, when the receiving object is a specific object in an off-blockchain channel, the receiving object information can include an identifier of the off-blockchain channel and an identifier of the object. In an implementation, the receiving object is the second account in the second blockchain network, and the receiving object information includes a receiving blockchain identifier (that is, the second blockchain network) and a receiving account (that is, the second account). The following description is based on the previous example.

The first account can be a user account or a contract account. In an implementation, the first data can be a transaction, a receipt, etc. in a blockchain network. In an implementation, the first data can be data with a specific structure, which, for example, is stored into a dedicated database on each node. Such data is stored into the blockchain network after being provided with consensus processing by corresponding nodes. Therefore, the data is consistent and authenticatable on each node.

Figure 3:
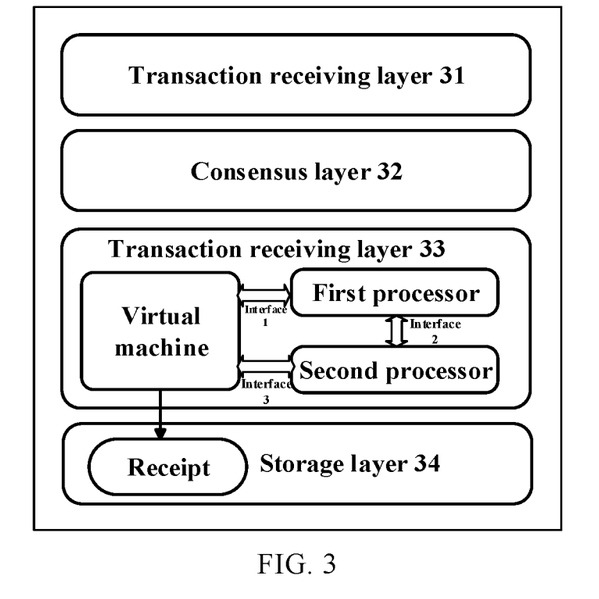
FIG. 3 is a schematic diagram illustrating a local structure of a node in a blockchain network, according to an implementation of the present specification.

FIG. 3 is a schematic diagram illustrating a local structure of a node in a blockchain network, according to an implementation of the present specification. The node is a full node in the blockchain network, and includes a transaction receiving layer 31, a consensus layer 32, a transaction execution layer 33, and a storage layer 34. As appreciated by a person of ordinary skill in the art, the transaction execution usually includes a virtual machine, configured to execute transaction-related executable code. In this implementation of the present specification, in addition to the virtual machine, the transaction execution layer includes a locally pre-determined processing module configured to store an authenticatable message (AM) into the blockchain network. As shown in FIG. 3, the processing module specifically includes a first processor and a second processor. The first processor includes a first interface (interface 1 in the figure), and the first interface is to be invoked by a virtual machine. The second processor includes a second interface (interface 2 in the figure) and a third interface (interface 3 in the figure). The second interface is to be invoked by the first processor to obtain an authenticatable message from the first processor, and generate data with a specific structure based on the authenticatable message. The third interface is connected to the virtual machine, to provide the data with a specific structure to the virtual machine, so that the virtual machine generates first data and stores the first data into the storage layer (for example, a block).

Specifically, for example, a first account in a first blockchain network invokes the first interface, to store the first data into the first blockchain network, so as to transfer an authenticatable message to a second account in a second blockchain network. When the first account invokes the first interface, at least the following parameters are input to the first processor: an identifier of the second blockchain network, the second account, and message content. After receiving an invocation request, the first processor obtains an account that initiates the invocation (that is, the first account), combines the first account, a pre-determined identifier of the first blockchain network, and the input parameters (that is, the identifier of the second blockchain network, the second account, and the message content) into an authenticatable message in a pre-determined format (that is, a pre-determined protocol), and provides the authenticatable message to the second processor. In an implementation, the first processor can invoke the second interface of the second processor, to transfer the authenticatable message to the second processor as a parameter.

Figure 4:
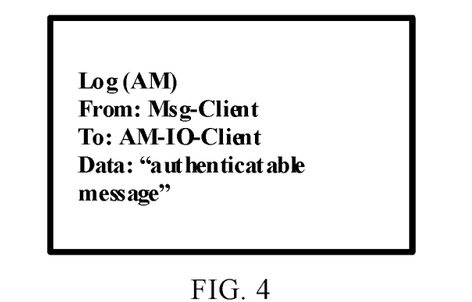
FIG. 4 is a schematic diagram illustrating a log generated by a second processor.

For example, after obtaining the authenticatable message, the second processor can generate data with a specific structure based on the authenticatable message. For example, the data with a specific structure is a log. FIG. 4 is a schematic diagram illustrating a log generated by a second processor. The log includes a pre-determined topic. For example, the topic can be "AM", which is used to indicate whether the log is a log for sending an AM message from a blockchain network to the outside. The sending field ("From"), the receiving field ("To"), and the data field ("Data" are respectively an identifier of the first processor (for example, Msg-Client), an identifier of the second processor (for example, AM-IO-Client), and the authenticatable message. After generating the log, the second processor sends the log to a virtual machine. After receiving the log, the virtual machine inputs the log to a transaction-related receipt, to generate first data. After consensus processing is performed on the first data, the first data is stored into a block of each node, to store the authenticatable message to the block.

After the receipt (that is, the first data) is stored into the block, the relay can query the first data by using, for example, any one of the following items in the log of the receipt: the pre-determined topic, the identifier of the first processor, and the identifier of the second processor. It can be understood that when the first data is data with a specific structure that is stored in a relational database, the first data does not need to be labeled with the pre-determined label.

It can be understood that the local structure of the node shown in FIG. 3 and the previous description are only examples, and this implementation of the present specification is not limited thereto. For example, the first data is not necessarily a receipt, and the first data may alternatively be a transaction or the data with a specific structure. The first data is not necessarily stored into the block by using a virtual machine. For example, after generating the data with a specific structure, after consensus processing is performed, the data with the specific structure is stored into a local relational database.

Figure 5:
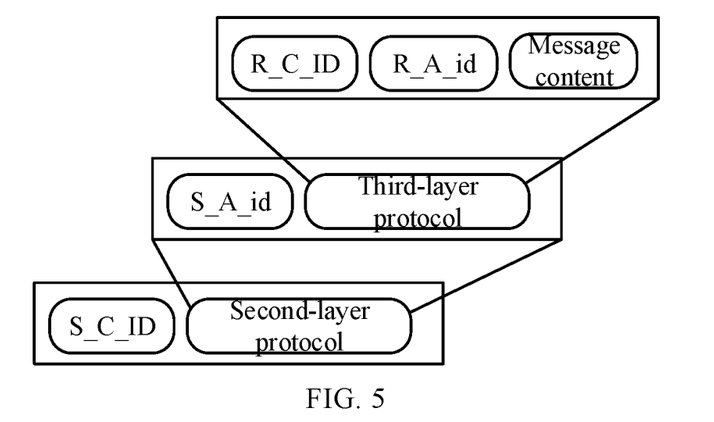
FIG. 5 is a schematic diagram illustrating a pre-determined protocol stack, according to an implementation of the present specification.

The pre-determined protocol can be specified according to a specific scenario, and is not limited here. In an implementation, when the receiving object is the second account in the second blockchain network, the authenticatable message satisfies the pre-determined protocol stack. FIG. 5 is a schematic diagram illustrating a pre-determined protocol stack, according to an implementation of the present specification. As shown in FIG. 5, the lowest layer is the first-layer protocol according to an implementation of the present specification. The first-layer protocol includes a sending blockchain identifier field (S_C_ID) and a second-layer protocol. The middle layer is a second-layer protocol, and the second-layer protocol includes a sending account field (S_A_id) and a third-layer protocol. The highest layer is the third-layer protocol, and the third-layer protocol includes a receiving blockchain identifier field (R_C_ID), a receiving account field (R_A_id), and a message content field. It can be understood that the sending account should be an account in a sending blockchain network, and the receiving account should be an account in a receiving blockchain network.

Figure 6:
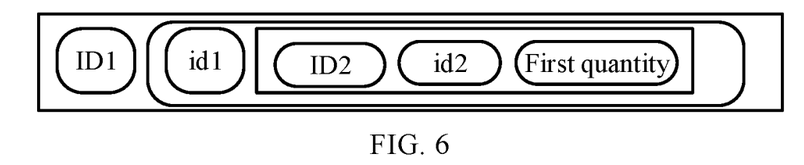
FIG. 6 is a schematic diagram illustrating a form of an authenticatable message.

For example, as described above, the authenticatable message is a message that is sent from a first account in the first blockchain network to a second account in the second blockchain network. Assuming that the blockchain identifier of the first blockchain network is ID1, the first account is id1, the blockchain identifier of the second blockchain network is ID2, and the second account is id2. FIG. 6 illustrates a form of an authenticatable message. As shown in FIG. 6, based on the protocol stack shown in FIG. 5, the first-layer protocol includes ID1 and the second-layer protocol, the second-layer protocol includes id1 and the third-layer protocol, and the third-layer protocol includes ID2, id2, and message content.

The protocol stack is designed based on a verification process of the authenticatable message. The first-layer protocol and the second-layer protocol respectively correspond to a verification process of the sending blockchain network and a verification process of the sending account, and the third-layer protocol corresponds to a specific communication process and service processing process. With such a protocol stack, after the authenticatable message is received, layered verification can be performed on the authenticatable message, and after the verification succeeds, message content can be obtained, and specific service processing can be performed. Therefore, the protocol at each layer has specific verification semantics for layered verification.

For example, the first data is a first receipt, and after receiving the first receipt, a verification node in the second blockchain network verifies the authenticatable message, including: verifying the sending blockchain identifier of the first-layer protocol in the authenticatable message. Verifying the sending blockchain identifier includes: using a simplified payment verification (SPV) method to verify, based on the first receipt, the block head of each block, and a Merkle tree path that is associated with the first receipt and that is included in the first block, that the first receipt is received from the first block in the first blockchain network, where the Merkle tree path is obtained based on the first location information. In addition, the verification can further include verifying the sending account in the second-layer protocol in the authenticatable message. Because the sending account in the authenticatable message is filled in by the first processor based on the invocation account of the first processor, after verifying that the block is a block in the first blockchain network, it is automatically verified that the first account is an account that sends the authenticatable message.

In an implementation, the first-layer protocol further includes a protocol version number field and a reserved field. As such, the protocol stack can be upgraded and extended. The reserved field is an empty field.

In an implementation, the second-layer protocol further includes a type field used to indicate a usage scenario type of the authenticatable message. As such, the protocol stack can be used in a stackable manner in different usage scenarios. For example, for different usage scenarios (that is, different types of authenticatable messages), the message content field can correspond to different content, different formats, etc. For example, the scenario type is any one of the following types: message type, remote procedure call type, issuance/subscription type, and account transfer.

The third-layer protocol further includes a sequence number field used to indicate a current sending sequence number when the authenticatable message is sent to the second account for a plurality of times by using the first account.

Figure 7:
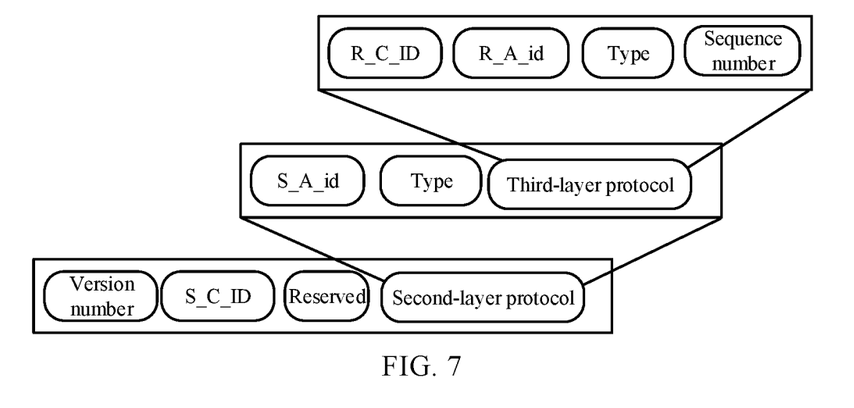
FIG. 7 is a schematic diagram illustrating a high-adaptability protocol stack, according to an implementation of the present specification.

FIG. 7 is a schematic diagram illustrating a high-adaptability protocol stack, according to an implementation of the present specification. As shown in FIG. 7, compared with the layers in the protocol stack shown in FIG. 5, the first-layer protocol in this protocol stack further includes a version number field and a reserved field, the second-layer protocol in this protocol stack further includes a tape field, and the third-layer protocol in this protocol stack further includes a sequence number field. As described above, this protocol stack can be upgraded and extended, can be used in a plurality of types of scenarios, and can be used for communication for multiple times, and therefore has high adaptability.

Figure 8:
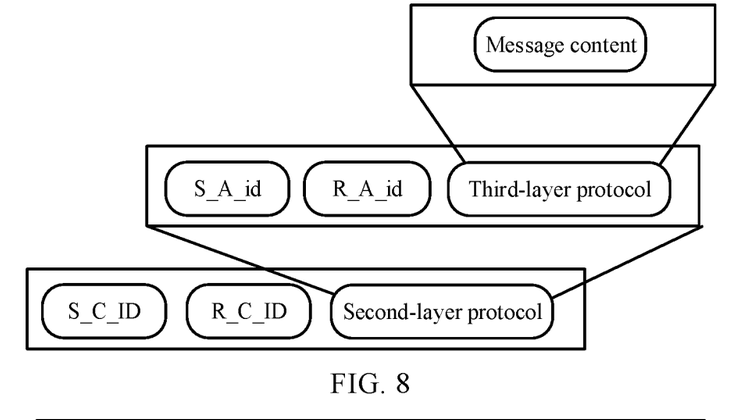
FIG. 8 is a schematic diagram illustrating another pre-determined protocol stack, according to an implementation of the present specification.

FIG. 8 is a schematic diagram illustrating another predetermined protocol stack, according to an implementation of the present specification. As shown in FIG. 8, the lowest layer is the first-layer protocol according to an implementation of the present specification. The first-layer protocol includes a sending blockchain identifier field (S_C_ID), a receiving blockchain identifier field (R_C_ID), and a second-layer protocol. The middle layer is a second-layer protocol, and the second-layer protocol includes a sending account field (S_A_id), a receiving account field (R_A_id), and a third-layer protocol. The highest layer is the third-layer protocol, and the third-layer protocol includes a message content field. It can be understood that the sending account should be an account in a sending blockchain network, and the receiving account should be an account in a receiving blockchain network.

Figure 9:
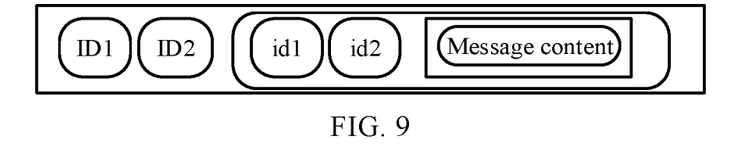
FIG. 9 is a schematic diagram illustrating a form of an authenticatable message.

For example, as described above, the authenticatable message is a message that is sent from a first account in the first blockchain network to a second account in the second blockchain network. Assuming that the blockchain identifier of the first blockchain network is ID1, the first account is id1, the blockchain identifier of the second blockchain network is ID2, and the second account is id2. FIG. 9 illustrates a form of an authenticatable message. As shown in FIG. 9, based on the protocol stack shown in FIG. 8, the first-layer protocol includes ID1, ID2, and the second-layer protocol, the second-layer protocol includes id1, id2, and the third-layer protocol, and the third-layer protocol includes message content.

The protocol stack is designed based on a verification process of the authenticatable message. The first-layer protocol corresponds to transfer from the first blockchain network to the second blockchain network, the second-layer protocol corresponds to transfer from the first account to the second account, and the third-layer protocol corresponds to a specific service processing process based on the message content after the transfer to the second account. With such a protocol stack design, when the authenticatable message is transferred, the authenticatable message is read from an outer layer to an inner layer. That is, ID2 in the first-layer protocol is first read, to transfer the authenticatable message to the second blockchain network; then id2 in the second-layer protocol is read, and the authenticatable message is transferred to the second account; and finally, the message content in the third-layer protocol is read and provided to the second account, so that the second account performs specific service processing based on the message content.

In an implementation, the first-layer protocol further includes a protocol version number field and a reserved field. As such, the protocol stack can be upgraded and extended. The reserved field is an empty field.

In an implementation, the third-layer protocol further includes a type field used to indicate a usage scenario type of the authenticatable message. As such, the protocol stack can be used in a stackable manner in different usage scenarios. The third-layer protocol further includes a sequence number field used to indicate a current sending sequence number when the authenticatable message is sent to the second account for a plurality of times by using the first account.

Field values of the protocol version number field, the reserved field, the type field, and the sequence number field can be input, in a similar way, to the first processor as input parameters when the first interface is invoked by the first account, so that the first processor can output, based on these input parameters, an authenticatable message including the field values.

Figure 10:
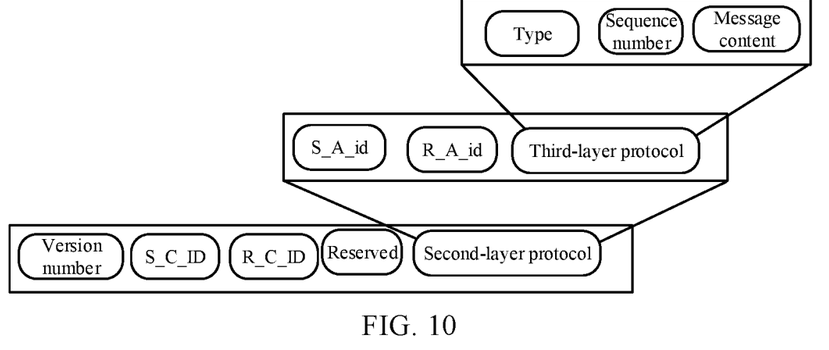
FIG. 10 is a schematic diagram illustrating a high-adaptability protocol stack, according to an implementation of the present specification.

FIG. 10 is a schematic diagram illustrating a high-adaptability protocol stack, according to an implementation of the present specification. As shown in FIG. 10, compared with the layers in the protocol stack shown in FIG. 8, the first-layer protocol in this protocol stack further includes a version number field and a reserved field, and the third-layer protocol in this protocol stack further includes a type field and a sequence number field. As described above, this protocol stack can be upgraded and extended, can be used in a plurality of types of scenarios, and can be used for communication for multiple times, and therefore has high adaptability.

In step S204, the first data and first location information are provided to the relay, to provide the authenticatable message to the receiving object, where the first location information indicates a location of the first data in the first blockchain network, and the relay is connected to a system in which the receiving object is located.

As described above, in this implementation of the present specification, different types of relays can be used, and the first data can be provided to the relay by using different methods based on different implementations of the relay. For example, when the receiving object is the second account in the second blockchain network, the relay is a node in the first blockchain network and the second blockchain network, so that the relay can obtain the first data from locally stored data (for example, a block or a status tree), and obtain the first location data. The first location data indicates a location of the first data in a blockchain network; for example, when the first data is a receipt, the first location data includes a number of a block in which the receipt is located and a number of the receipt in the block. For example, the relay is a transition device connected to both the first blockchain network and the second blockchain network, so that any node in the first blockchain network can locally obtain the first data and location information of the first data based on a request of the relay, and send the first data and location information of the first data to the relay. After obtaining the first data and location information of the first data, the relay can perform different steps based on a form of the relay, to provide an authenticatable message in the first data to the second account in the second blockchain network.

Figure 11:
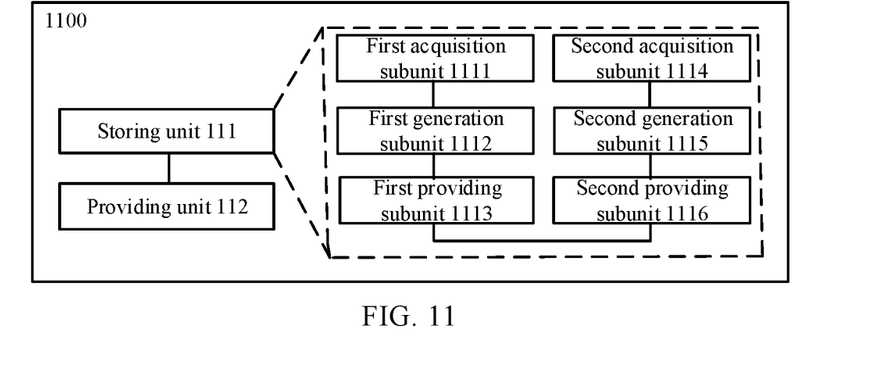
FIG. 11 is a schematic diagram illustrating a device 1100 for sending a cross-chain authenticatable message, according to an implementation of the present specification.

FIG. 11 illustrates a device 1100 for sending a cross-chain authenticatable message, where sending a cross-chain authenticatable message refers to sending the authenticatable message from a first account in a first blockchain network to the outside, and the first blockchain network is connected to the relay. The method is disposed in the first blockchain network and includes: a storing unit 111, configured to store first data through consensus into the first blockchain network by using a first interface that is of a locally pre-determined processing module and that is invoked by the first account, and based on processing of the processing module, where the first data includes an authenticatable message, and the authenticatable message includes at least the following fields that satisfy a pre-determined protocol: a sending blockchain identifier, a sending account, receiving object information, and message content, where the sending blockchain identifier and the sending account respectively correspond to the following field values: an identifier of the first blockchain network and the first account, and the following parameters are input when the first account invokes the first interface: receiving object information and message content; and a providing unit 112, configured to provide the first data and first location information to the relay, to provide the authenticatable message to the receiving object, where the first location information indicates a location of the first data in the first blockchain network, and the relay is connected to a system in which the receiving object is located.

In an implementation, the processing module includes a first processor and a second processor, the first interface is an interface of the first processor, and the storing unit further includes the following subunits disposed in the first processor: a first acquisition subunit 1111, configured to obtain at least the following parameters from the invocation by using the first interface: a first account, receiving object information, and message content; a first generation subunit 1112, configured to generate the authenticatable message based on the parameters; and a first providing subunit 1113, configured to provide the authenticatable message to the second processor.

In an implementation, the storing unit further includes the following subunits disposed in the second processor: a second acquisition subunit 1114, configured to obtain the authenticatable message from the first processor; and a second generation subunit 1115, configured to generate data with a specific structure based on the authenticatable message, to generate first data.

In an implementation, the second processor has a second interface, and the first providing subunit is further configured to provide the authenticatable message to the second processor by invoking the second interface.

In an implementation, the first data is a receipt, the data with a specific data structure is a log, a sending field, a receiving field, and a data field of the log are respectively an identifier of the first processor, an identifier of the second processor, and the authenticatable message, and the second processor further includes a second providing subunit 1116 disposed in the second processor, configured to: after the log is generated, provide the log to the virtual machine by using the third interface, to generate the first data.

Another aspect of the present specification provides a computer readable storage medium, where the medium stores a computer program, and when the computer program is executed on a computer, the computer is enabled to perform any one of the previous methods.

Another aspect of the present specification provides a computing device, including a memory and a processor, where the memory stores executable code, and when the processor executes the executable code, any one of the previous methods is implemented.

In the cross-chain solution provided in the implementations of the present specification, a platform-level processor performs related processing on the authenticatable message, to increase the processing speed and efficiency. In addition, in the processor, data with a specific structure can be customized by using a ledger on the platform, to improve the performance and scalability. In addition, according to an abstract blockchain network interoperation model in the cross-chain solution provided in the implementations of the present specification, an authenticatable message is designed, so that a message sent from a blockchain network can be verified by another blockchain network to determine a specific blockchain network from which the message is sent and a specific identity entity (account number/contract) from which the message is sent. As such, based on the authenticatable message, cross-chain applications (contracts) can be programmed, so that developers can develop various cross-chain services and applications more easily.

It should be understood that terms such as "first" and "second" in the present specification are only used to distinguish between similar concepts for ease of description, and does not impose any other limitation.

It is worthwhile to note that the implementations of the present specification are described in a progressive way. For same or similar parts of the implementations, mutual references can be made to the implementations. Each implementation focuses on a difference from the other implementations. Particularly, a system implementation is basically similar to a method implementation, and therefore is described briefly. For related parts, references can be made to related descriptions in the method implementation.

Specific implementations of the present specification are described above. Other implementations fall within the scope of the appended claims. In some situations, the actions or steps described in the claims can be performed in an order different from the order in the implementation and the desired results can still be achieved. In addition, the process depicted in the accompanying drawings does not necessarily require a particular execution order to achieve the desired results. In some implementations, multi-tasking and parallel processing can be advantageous.

A person of ordinary skill in the art can be further aware that, in combination with the examples described in the implementations disclosed in the present specification, units and algorithm steps can be implemented by electronic hardware, computer software, or a combination thereof. To clearly describe the interchangeability between the hardware and the software, the previous has generally described compositions and steps of each example according to functions. Whether the functions are performed by hardware or software depends on particular applications and design constraint conditions of the technical solutions. A person of ordinary skill the art can use different methods to implement the described functions for each particular application, but it should not be considered that the implementation goes beyond the scope of the present disclosure.

In combination with the implementations disclosed in the present specification, method or algorithm steps can be implemented by hardware, a software module executed by a processor, or a combination thereof. The software module can reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

The objectives, technical solutions, and benefits of the present disclosure are further described in detail in the previous specific implementations. It should be understood that the previous descriptions are merely specific implementations of the present disclosure, but are not intended to limit the protection scope of the present disclosure. Any modification, equivalent replacement, or improvement made within the spirit and principle of the present disclosure shall fall within the protection scope of the present disclosure.

What is claimed is:

1. A computer-implemented method for sending cross-chain messages comprising:
storing, through consensus of blockchain nodes of a first blockchain network, an authenticatable message (AM) associated with a first account to a blockchain associated with the first blockchain network, the storing comprising:
receiving, by a first processor of a blockchain node of the first blockchain network, an invocation request for a smart contract, wherein the invocation request is invoked by the first account through a first interface of the first processor, and the invocation request includes recipient object information and message content;
after receiving the invocation request, (i) obtaining, by the first processor of the blockchain node, an identifier of the first account, and (ii) generating, by the first processor of the blockchain node, the AM such that the AM comprises, in a pre-determined format, an identifier of the first blockchain network, the identifier of the first account, the recipient object information, and the message content;
receiving the generated AM, by a second, different, processor of the blockchain node and from the first processor of the blockchain node, wherein the generated AM is received through a second interface of the second processor that is invoked by the first processor of the blockchain node; and
after receiving the generated AM, (i) generating, by the second processor of the blockchain node, a log that includes the AM and a topic that indicates that the AM is to be sent to a recipient outside of the first blockchain network, and (ii) sending the log, by the second processor of the blockchain node and to a virtual machine of the blockchain node, for storage on the blockchain associated with the first blockchain network; and
transmitting the AM and location information to a relay to be forwarded to the recipient located outside of the first blockchain network based on the topic that indicates that the AM is to be sent to the recipient outside of the first blockchain network, wherein the location information identifies a location of the AM in the first blockchain network and the recipient includes one or more accounts outside of the first blockchain network.

2. The computer-implemented method according to claim 1, wherein the log that includes the AM and the topic has a predetermined data structure.

3. The computer-implemented method according to claim 2, wherein the topic is a predetermined label.

4. The computer-implemented method according to claim 3, wherein the predetermined label includes an identifier of the first processor or an identifier of the second processor.

5. The computer-implemented method according to claim 3, wherein the predetermined label indicates that the log corresponds to the AM.

6. The computer-implemented method according to claim 2, wherein the log includes a sending field filled by an identifier of the first processor, a receiving field filled by an identifier of the second processor, and a data field filled by the AM, and wherein the second processor comprises a third interface connected to the virtual machine, and the log is provided to the virtual machine by using the third interface to generate a receipt associated with the log.

7. The computer-implemented method according to claim 1, wherein the first account is a contract account of the smart contract.

8. The computer-implemented method according to claim 1, wherein the relay is communicably coupled to a second blockchain network, and the recipient object information comprises an identifier of the second blockchain network and an identifier of a second account associated with the second blockchain network.

9. The computer-implemented method according to claim 8, wherein the AM is generated based on a protocol stack comprising an outer-layer protocol, a middle-layer protocol, and an inner-layer protocol, wherein the outer-layer protocol comprises an identifier of an originating blockchain network and the middle-layer protocol, the middle-layer protocol comprises information of a sending account and the inner-layer protocol, and the inner-layer protocol comprises an identifier of a destination blockchain network, information of a receiving account associated with the destination blockchain network, and content of a message from the sending account to the receiving account.

10. The computer-implemented method according to claim 9, wherein the outer-layer protocol further comprises a version number of the protocol stack and a reserved field.

11. The computer-implemented method according to claim 9, wherein the middle-layer protocol further comprises a type field indicating a type of usage scenario of the AM.

12. The computer-implemented method according to claim 11, wherein the type of usage scenario is one of messaging, remote procedure call, issuance, and subscription.

13. The computer-implemented method according to claim 9, wherein the inner-layer protocol further comprises a sequence number indicating a relative time-sequence of the AM in a sequence of AMs sent to the receiving second account.

14. The computer-implemented method according to claim 9, wherein the originating blockchain network is the first blockchain network, the sending account is the first account, the destination blockchain network is the second blockchain network, the receiving account is the second account, and the message from the sending account to the receiving account is the message content.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:
storing, through consensus of blockchain nodes of a first blockchain network, an authenticatable message (AM) associated with a first account to a blockchain associated with the first blockchain network, the storing comprising:
receiving, by a first processor of a blockchain node of the first blockchain network, an invocation request for a smart contract, wherein the invocation request is invoked by the first account through a first interface of the first processor, and the invocation request includes recipient object information and message content;
after receiving the invocation request, (i) obtaining, by the first processor of the blockchain node, an identifier of the first account, and (ii) generating, by the first processor of the blockchain node, the AM such that the AM comprises, in a pre-determined format, an identifier of the first blockchain network, the identifier of the first account, the recipient object information, and the message content;
receiving the generated AM, by a second, different, processor of the blockchain node and from the first processor of the blockchain node, wherein the generated AM is received through a second interface of the second processor that is invoked by the first processor of the blockchain node; and
after receiving the generated AM, (i) generating, by the second processor of the blockchain node, a log that includes the AM and a topic that indicates that the AM is to be sent to a recipient outside of the first blockchain network, and (ii) sending the log, by the second processor of the blockchain node and to a virtual machine of the blockchain node, for storage on the blockchain associated with the first blockchain network; and
transmitting the AM and location information to a relay to be forwarded to the recipient located outside of the first blockchain network based on the topic that indicates that the AM is to be sent to the recipient outside of the first blockchain network, wherein the location information identifies a location of the AM in the first blockchain network and the recipient includes one or more accounts outside of the first blockchain network.

16. The computer-implemented system according to claim 15, wherein the log that includes the AM and the topic has a predetermined data structure.

17. The computer-implemented system according to claim 16, wherein the topic is a predetermined label.

18. The computer-implemented system according to claim 17, wherein the predetermined label includes an identifier of the first processor or an identifier of the second processor.

19. The computer-implemented system according to claim 16, wherein the log includes a sending field filled by an identifier of the first processor, a receiving field filled by an identifier of the second processor, and a data field filled by the AM, and wherein the second processor comprises a third interface connected to the virtual machine, and the log is provided to the virtual machine by using the third interface to generate a receipt associated with the log.

20. A non-transitory, computer-readable medium storing one or more instructions executable by a computer system to perform operations comprising:
storing, through consensus of blockchain nodes of a first blockchain network, an authenticatable message (AM) associated with a first account to a blockchain associated with the first blockchain network, the storing comprising:
receiving, by a first processor of a blockchain node of the first blockchain network, an invocation request for a smart contract, wherein the invocation request is invoked by the first account through a first interface of the first processor, and the invocation request includes recipient object information and message content;
after receiving the invocation request, (i) obtaining, by the first processor of the blockchain node, an identifier of the first account, and (ii) generating, by the first processor of the blockchain node, the AM such that the AM comprises, in a pre-determined format, an identifier of the first blockchain network, the identifier of the first account, the recipient object information, and the message content;
receiving the generated AM, by a second, different, processor of the blockchain node and from the first processor of the blockchain node, wherein the generated AM is received through a second interface of the second processor that is invoked by the first processor of the blockchain node; and after receiving the generated AM, (i) generating, by the second processor of the blockchain node, a log that includes the AM and a topic that indicates that the AM is to be sent to a recipient outside of the first blockchain network, and (ii) sending the log, by the second processor of the blockchain node and to a virtual machine of the blockchain node, for storage on the blockchain associated with the first blockchain network; and transmitting the AM and location information to a relay to be forwarded to the recipient located outside of the first blockchain network based on the topic that indicates that the AM is to be sent to the recipient outside of the first blockchain network, wherein the location information identifies a location of the AM in the first blockchain network and the recipient includes one or more accounts outside of the first blockchain network.

21. The non-transitory, computer-readable medium of claim 20, wherein the log that includes the AM and the topic has a predetermined data structure.

22. The non-transitory, computer-readable medium of claim 21, wherein the topic is a predetermined label.

23. The non-transitory, computer-readable medium of claim 22, wherein the predetermined label includes an identifier of the first processor or an identifier of the second processor.

24. The non-transitory, computer-readable medium of claim 21, wherein the log includes a sending field filled by an identifier of the first processor, a receiving field filled by an identifier of the second processor, and a data field filled by the AM, and wherein the second processor comprises a third interface connected to the virtual machine, and the log is provided to the virtual machine by using the third interface to generate a receipt associated with the log.

* * * * *

UNITED STATES PATENT AND TRADEMARK OFFICE
CERTIFICATE OF CORRECTION

PATENT NO. : 11,356,282 B2
APPLICATION NO. : 16/786807
DATED : June 7, 2022
INVENTOR(S) : Qiu It is certified that error appears in the above-identified patent and that said Letters Patent is hereby corrected as shown below:

In the Claims

Column 15, Line 30, in Claim 13, delete "the receiving" and insert -- the --.

Signed and Sealed this
Thirtieth Day of August, 2022

Katherine Kelly Vidal
*Director of the United States Patent and Trademark Office*